Figure 1:
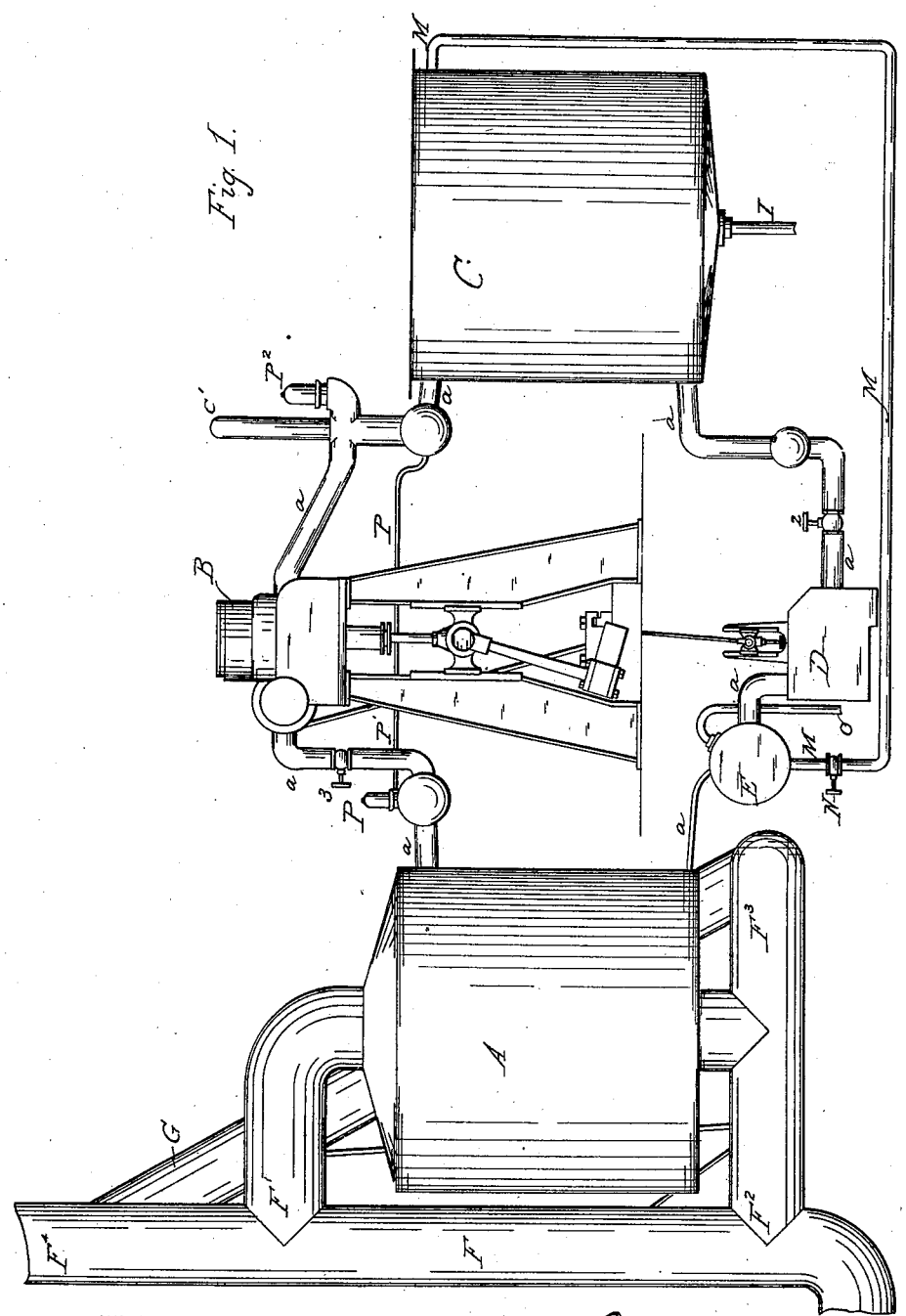

No. 668,682. Patented Feb. 26, 1901.
J. C. HENDERSON.
METHOD OF UTILIZING CARBONIC ACID GAS FOR MOTIVE PURPOSES.
(Application filed May 23, 1895.)
(No Model.) 4 Sheets—Sheet 1.

WITNESSES:
INVENTOR
John C. Henderson
BY James R. Rogers
ATTORNEY.

No. 668,682. Patented Feb. 26, 1901.
J. C. HENDERSON.
METHOD OF UTILIZING CARBONIC ACID GAS FOR MOTIVE PURPOSES.
(Application filed May 23, 1895.)
(No Model.) 4 Sheets—Sheet 3.
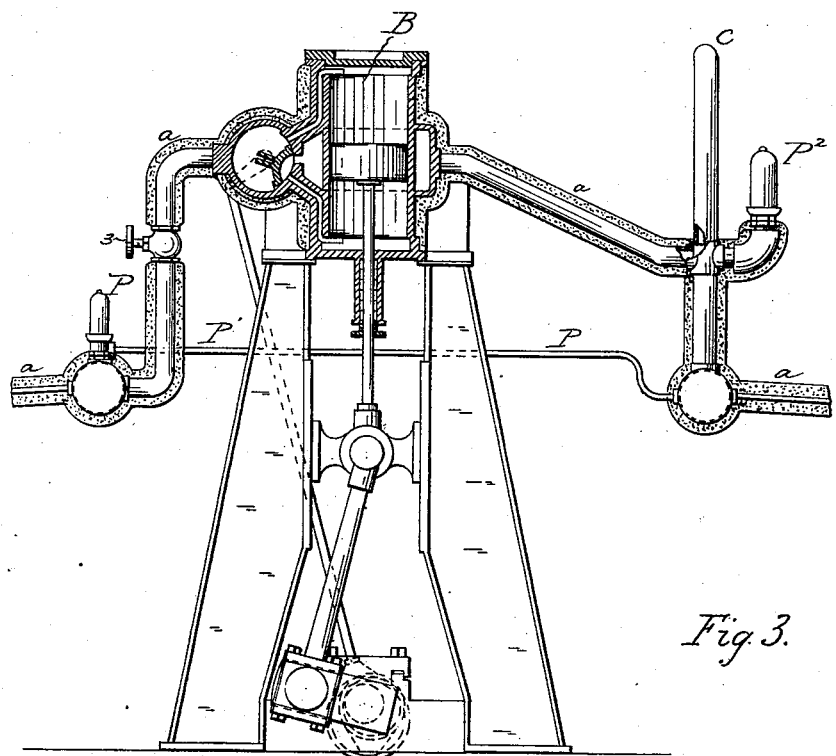
*Fig. 3.*
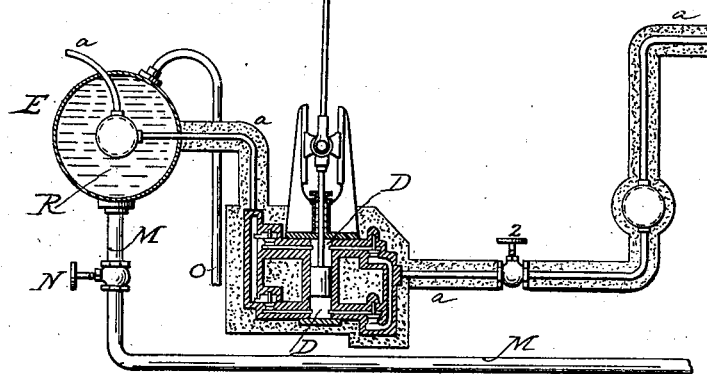
WITNESSES:
INVENTOR
John C. Henderson
BY
James R. Rogers
ATTORNEY.

No. 668,682. Patented Feb. 26, 1901.
J. C. HENDERSON.
METHOD OF UTILIZING CARBONIC ACID GAS FOR MOTIVE PURPOSES.
(Application filed May 23, 1895.)
(No Model.) 4 Sheets—Sheet 4.

WITNESSES:
INVENTOR
John C. Henderson
BY
James R. Rogers
ATTORNEY.

UNITED STATES PATENT OFFICE.

JOHN C. HENDERSON, OF NEW YORK, N. Y., ASSIGNOR TO THE AMERICAN MOTOR COMPANY, (JOHN C. SCOTT, PRESIDENT AND AS TRUSTEE,) OF SAME PLACE.

METHOD OF UTILIZING CARBONIC-ACID GAS FOR MOTIVE PURPOSES.

SPECIFICATION forming part of Letters Patent No. 668,682, dated February 26, 1901.

Application filed May 23, 1895. Serial No. 550,462. (No specimens.)

*To all whom it may concern:*

Be it known that I, JOHN C. HENDERSON, a citizen of the United States, residing at New York, in the county of New York and State of New York, have invented certain new and useful Improvements in Methods of Using Gases for Motive Power and Apparatus Therefor; and I do hereby declare the following to be a full, clear, and exact description of the invention, such as will enable others skilled in the art to which it appertains to make and use the same.

The invention relates to certain new and useful improvements in utilizing carbonic-acid gas, which is incombustible, non-inflammable, and non-explosive, and carbonic-acid gas mixed with other media, as hereinafter referred to, for the transformation of heat into power; and the objects of my invention are to cause carbonic-acid gas or carbonic-acid gas mixed with other media to make a complete continuous operation, assuming in one cycle four phases, namely: First, rarefication or evaporation produced by heat direct from action of fire or from flue-gases, waste steam, direct steam, hot water, electric current, or other well-known methods of heating liquids and gases; second, operation of the motor connected with and operated by the rarefication and evaporation of the medium employed; third, refrigeration and condensation carried on by currents of water, air, or other cooling media through tubes or chambers internal or external, and, fourth, replacement of the medium employed, which operation is carried on either by the motor or by the separate and independent action of the gas or by any outside application thereof.

The use of carbonic-acid gas as a medium for the conversion of heat into motive power or mechanical motion is not new, this having been accomplished principally by the alternate heating and cooling of the gas, either in a compressed condition or allowed to expand to atmospheric pressure and lost or again compressed to be returned and worked over again, all of which methods have been so far but partially successful. My invention, however, consists in the employment of a complete cycle of four phases and of continuous operation at and above the liquefaction-point, thus doing away with the loss in reheating and cooling certain parts of the apparatus, as well as the loss of time expended in intermitting or alternating operation, as heretofore practiced and carried out by others, and also doing away with the necessity of reheating and expanding the gas.

In carrying out my invention the carbonic-acid gas may be used alone, or the carbonic-acid gas may be used combined with some other liquid or liquids, gas or gases—as water, acetylene, glycerin, petroleum, or air—the mixture being always at or above the temperature and pressure of the liquefaction-point of carbonic-acid gas, and the proportion of the carbonic-acid gas to the other media of the mixture being such that the mixture is responsive to the successive operations, as is the carbonic-abid gas when used alone, through the four phases of different temperatures and throughout the one continuous cycle.

Figure 2:
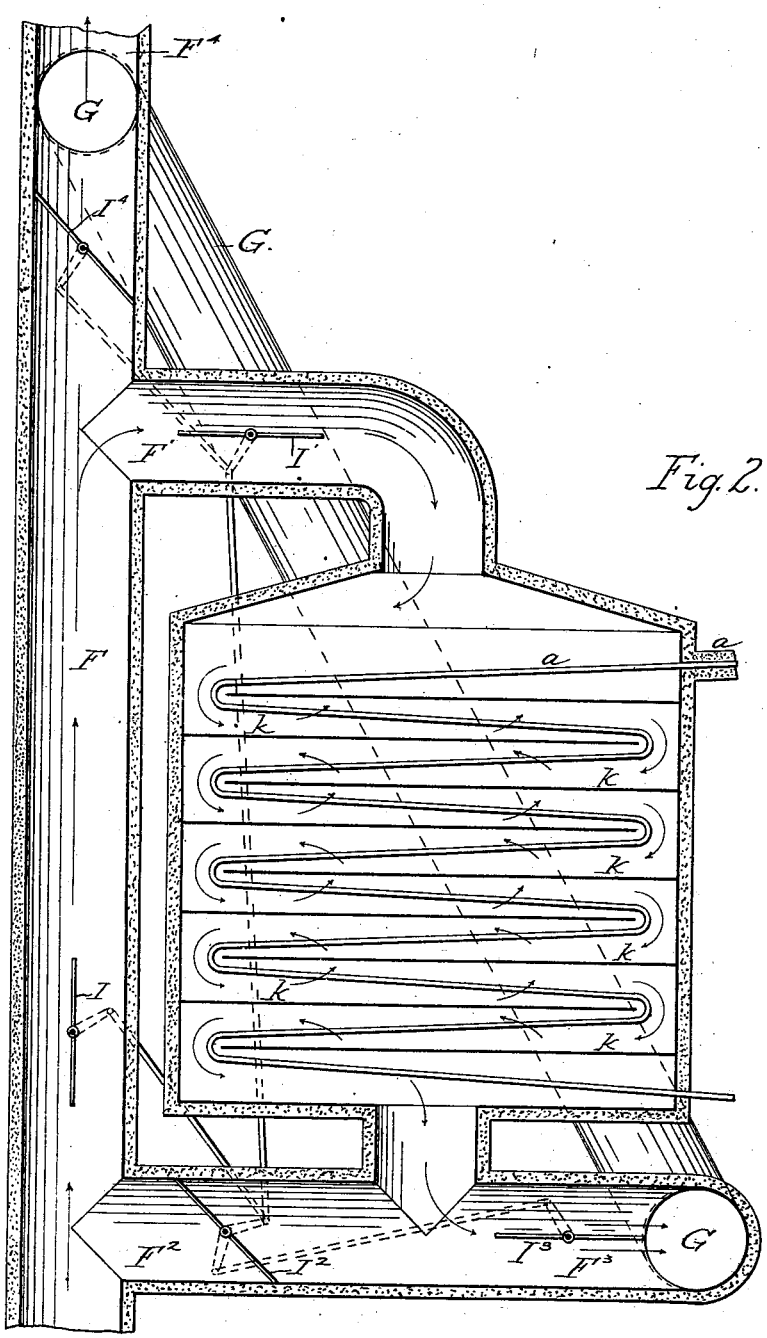
Figure 4:
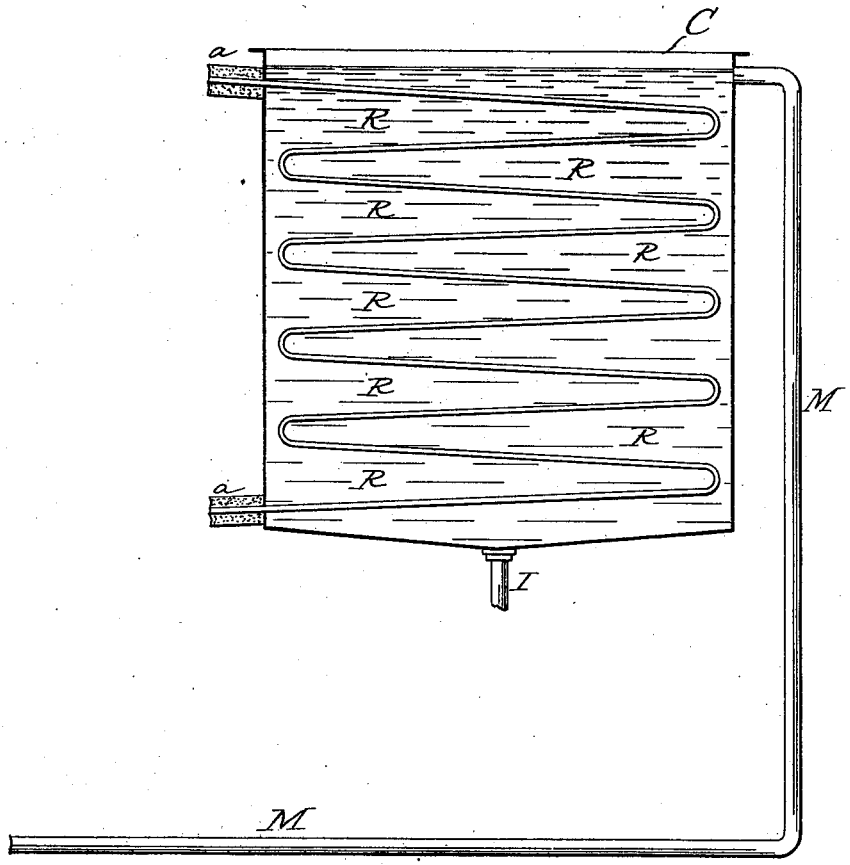

The following is a description of the apparatus I employ for operating upon the gas or liquid elected for use and for attaining the objects mentioned:

Figure 1 of the drawings is a side view of the apparatus. Fig. 2 is a vertical sectional view through the evaporizer or heater. Fig. 3 is a sectional view of the motor and parts connecting it with the evaporizer and with the air-cushion and condenser; also, a sectional view of the replacing-pump and connections thereof; and Fig. 4 is a sectional view of the condenser and its connections.

Similar characters refer to similar parts throughout the several views.

The rarefier, evaporizer, or heater A is connected at its top and bottom to the heated air or gas chamber F by means of inlets $F'$ $F^2$, in which are located dampers $I'$ $I^2$, the damper $I^3$ being in the lower horizontal extended portion of the heated air or gas chamber $F^3$, while damper $I^4$ is placed in the vertical extended part of the chamber $F^4$ $F^4$ in the outlet leading from the evaporizer or heater A. The damper I is located in the passage of the air or gas chamber F. The air or gas chamber F may be connected to a furnace or to a waste-flue. The waste gases from boilers and driers may be utilized by being passed through the chamber, as well as the waste heat and gases from sugar-refineries and from other manufacturing plants, and the chamber F may be provided with a damper I to regulate the passage of the heated air or gas therethrough, and all of the dampers above mentioned are provided with crank-arms or bell-cranks suitably connected by links or rods, so that the dampers may be operated as desired.

The letter G represents the by-pass flue connecting the two portions of the air-chamber $F^3$ and $F^4$.

Inside of the evaporizer are arranged the flue-plates $k$ $k$, and $a$ $a$ are tubes through which the gas or liquid employed circulates from the evaporizer to the motor, from the motor to the elastic cushion $c'$, from the elastic cushion $c'$ to the condenser C, from thence to the replacing-pump D, and through the interchanger E, to be carried again to the evaporizer or heater A.

P represents a safety-valve upon the by-pass connection $P'$ $P'$ between the evaporizer A and the elastic cushion $c'$ and the condenser C.

3 is the main stop-valve, located in the pipe $a$, leading from the evaporizer A to the motor B.

$c'$ is an elastic cushion connected with the pipes $a$ $a$, leading from the motor B to the condenser C, and $P^2$ is a safety-valve in connection with the one of said pipes $a$ leading from the motor B to the elastic cushion $c'$.

To successfully heat carbonic acid, it must be in a liquid condition and it must be accomplished as quickly as possible. This is done by keeping the liquid carbonic-acid gas in the pump up to the proper temperature and pressure.

To keep the exhausted carbonic-acid gas that has left the motor or engine in a liquid state in the lower part of the condenser, it is necessary to keep the condenser at a constant temperature and pressure and to maintain the pressure in the condenser constant and free from excessive fluctuation, due to the entrance of the contents of the motor-cylinder and to the difference between the carbonic-acid gas and an exhaust-gas or a condensed fluid, due to the action of the cut-off of the motor when losing load, when the gas in the condenser will rush back into the cylinder, as the exhaust will be below the pressure of the condenser, or if the exhaust for the same reason is above the pressure. The air in the cushion or air-chamber is used as the most handy non-condensible gas, as it is lighter than carbonic-acid gas. Any other gas lighter than carbonic-acid gas would answer the same purpose to follow and keep driving down the exhaustive carbonic-acid gas to its zone of liquefaction, and it being situated on the upper part of the condenser and lighter than carbonic-acid gas remains in the upper portion of the cushion or air-chambers. As long as there is a circulation of carbonic-acid gas from the motor to the condenser it remains in the lower part of the cushion or air-chamber.

C is the condenser, through which the water R or any other cooling agent is caused to circulate by means of the inlet-pipe I and out of the condenser C by means of the overflow-pipe M to the interchanger E, and thence out through the overflow-pipe $o$, or the interchanger may be supplied independently with a cooling agent by means of the pipe and which may pass out through the overflow-pipe $o$.

D is the replacing-pump for returning the liquefied gas from the condenser C to the evaporizer A through the interchanger E.

2 is a stop-cock in the pipe $a$, leading from the condenser C to the replacing-pump D, and N is a regulating-valve located in the pipe M, leading from the condenser C to the interchanger E, and R represents the water or cooling agent employed.

The apparatus operates in the following manner: Liquid carbonic-acid gas, starting in the evaporizer A under a nearly uniform pressure, but with rising temperatures, thus causing a continuous and gradually-increasing tension, proceeds in the cycle of operations to the motor, which takes up as much of this increasing tension directly as is called for by the outside resistance or work of the motor by intermittent charges in a reciprocating or a continuous flow, as in a motor of a rotary or turbine type, and the gas, continuing on or exhausting into the condenser C below and under a cushion of atmospheric air or gas in the elastic cushion $c'$, is of nearly uniform pressure, but of lowering temperature, thus gradually decreasing in tension until the liquid point is again reached and continues on to the replacing-pump D, through the interchanger E, to the evaporizer A, its starting-point, and thus completing the cycles of continuous increasing and decreasing tensions for power or motive purposes. The evaporized carbonic-acid gas in its passage from the motor B, through the pipe $a$, to the condenser C has exerted upon it a constant, continuous, elastic, and downward pressure by means of the column of atmospheric air or gas in the elastic cushion $c'$, located between the above motor B and the condenser C and above the line of travel of the carbonic gas. Each molecule of this gas in its continuous cycles of travel from the motor B to the condenser C is ever subjected to the constant, continuous, elastic, and downward pressure of the column of atmospheric air or gas in the elastic cushion $c'$.

The gas employed for motive and power purposes is heated to about 125° Fahrenheit and to about eighteen hundred pounds pressure and when released after having performed the necessary work is subjected to a constant, elastic, and downward pressure of about one thousand pounds. It is then cooled, returned to be again reheated, and reused.

By changing or substituting heated water or other media for flue-gases and air and like agents the same operation takes place.

This cycle can be made to generate mechanical power with the use of heat from a number of sources—as, for instance, waste heat from products of gas-retorts, exhaust-steam from high-pressure engines, or waste water from condensing-engines, escaping flue-gases after leaving the boilers before entering the stack, reflected and concentrated solar rays in tropical climates, or other equally conditioned situations.

What I claim, and desire to secure by Letters Patent, is—

1. The method of evaporizing and energizing carbonic-acid gas for the purpose of obtaining power, which consists in developing its energy by heating the gas, partially releasing the same for producing power, subjecting the gas so relieved to a downward pressure and replacing the same for a renewal of its power, substantially as described.

2. The method of obtaining the energy from carbonic-acid gas for motive power, first heating the gas, partially releasing the same for producing work, keeping the gas constantly subjected to an elastic downward pressure, cooling the same, and returning the gas for the purpose of reënergizing and renewing of its power, substantially as described.

3. The method of producing energy from carbonic-acid gas for motive power, which consists in heating the gas to about eighteen hundred pounds pressure, partially releasing the pressure, in obtaining work or energy therefrom, subjecting the released gas to a constant elastic downward pressure, of about one thousand pounds, cooling the same, returning the gas for the purpose of reheating and reusing the same, as herein set forth.

4. The method of evaporizing and energizing carbonic acid for power purposes, consisting in increasing its temperature to about 125° Fahrenheit and about eighteen hundred pounds pressure for obtaining power, continuously decreasing its temperature and subjecting the gas to a continuous downward elastic pressure, further decreasing its temperature, and liquefying the gas, reheating and reconverting to the gaseous state for reuse, substantially as described.

In testimony whereof I affix my signature in presence of two witnesses.

JOHN C. HENDERSON.

Witnesses:
 J. ARTHUR GIVENS,
 WILLIAM MOLLOY.